United States Patent [19]
O'Meara

[11] 3,988,608
[45] Oct. 26, 1976

[54] ADAPTIVE IMAGING TELESCOPE WITH NONLINEAR SENSING AND ELECTRO-OPTICAL PHASE SHIFTING

[75] Inventor: Thomas R. O'Meara, Malibu, Calif.
[73] Assignee: Hughes Aircraft Company, Culver City, Calif.
[22] Filed: June 24, 1974
[21] Appl. No.: 482,186

[52] U.S. Cl. ............................. 250/201; 350/160 R
[51] Int. Cl.² ............................................. G01J 1/20
[58] Field of Search .......... 250/201, 202, 203, 578; 350/160, 162 R, 162 SC, 17, 20 S; 178/DIG. 25; 331/94.5

[56] References Cited
UNITED STATES PATENTS

| | | | |
|---|---|---|---|
| 3,594,660 | 7/1971 | Huggett | 350/160 R |
| 3,705,758 | 12/1972 | Haskall | 350/160 R |
| 3,713,042 | 1/1973 | Kinsel | 331/94.5 |
| 3,731,103 | 5/1973 | O'Meara | 250/199 |
| 3,783,269 | 1/1974 | McConnell | 250/201 |
| 3,846,628 | 11/1974 | Towne | 250/201 |

*Primary Examiner*—David C. Nelms
*Attorney, Agent, or Firm*—Martin E. Gerry; W. H. MacAllister

[57] ABSTRACT

An adaptive imaging telescope having nonlinear sensing means for detecting an optical beam received thereby. The system comprises a phase shifter, positioned at the aperture of the telescope, responsive to the optical beam. This system also includes a nonlinear image quality sensor, optically coupled to the phase shifter, comprisinng a photodetector plate responsive to the optical beam for converting the optical beam into an electrical signal. Analog circuits are provided to receive the sensor output and provide a closed-loop return to the phase shifter.

21 Claims, 7 Drawing Figures

ADAPTIVE IMAGING TELESCOPE WITH NONLINEAR SENSING AND ELECTRO-OPTICAL PHASE SHIFTING

CROSS-REFERENCE TO RELATED COPENDING APPLICATIONS

Applications, Ser. Nos. 482,175; 482,185; 482,187; and 428,188 were all filed June 24, 1974, concurrent with this application.

BACKGROUND OF THE INVENTION

This invention is in the field of adaptive imaging telescopes, and in particular such telescopes that compensate images viewed through atmospheric turbulence.

The atmosphere has a substantial effect on a portion of a wavefront impinging on a small aperture, say four inches or less in diameter at visible wavelengths. The impinged wavefronts can be decomposed into phase effects, and amplitude or scintillation effects. The phase effects are of major importance, causing a spatially uniform but time-varying or random advance or retardation of the wavefront as a whole which can easily be as large as several times $2\pi$ radians.

In large telescopes which may be considered as compounded telescopes due to superposition of the above small apertures, the first effect mentioned is overwhelmingly troublesome. More specifically, the subapertures may be paired, and it may be shown that each pair of subapertures generates its own characteristics Fourier component fringe pattern in the image plane. In the distortionless propagation case, all of these fringe patterns add constructively at the image center and effectively add more and more destructively at positions in the image plane progressively removed from the center. Since the first mentioned effect can change either the position of the fringes or the phase of the optical carrier which is spatially modulated by them, it can readily happen that the desired constructive interference on axis, and destructive interference off axis, is not obtained. Consequently, peak image intensity is reduced and the image is not narrowed by the superposition of fringe patterns, or at least it is not narrowed to the full potential of the system. Thus, images are smeared out by these atmospheric effects and imaging through long atmospheric paths, with apertures exceeding four inches diameter, is usually limited by this phenomenon rather than by the optics of the imaging system.

Prior art systems have employed several restoration schemes. One classificational scheme is post-film-recording or restoration system, and pre-film-recording or pre-correction system. By far, the largest number of schemes have been of the post-film-recording category and, as one consequence, have not been real-time systems. Of the pre-film-recording techniques, holographic methods have been the most widely explored, and again these have not been in real time. Many suggested techniques, including holography have required a reference, that is a known, ideally, a small source to one side of the unknown source object. In most practical cases an ideal reference natural source is simply not available.

SUMMARY OF THE INVENTION

It is, therefore, an object of the instant invention to reduce the image smearing results by introducing corrective phase control across the receiving aperture which effectively restores the desired fringe superposition, and hence the clarity of the resultant image.

Another object of the instant invention is to eliminate the need for an adjacent reference source, nor a priori, make assumptions symmetrical source distributions exist in the assumed source.

A further object is to provide a real-time operative system. That is, image corrections in the instant system must be accomplished within $10^{-2}$ seconds, since the atmosphere may substantially change in a period not much greater than this time period.

A still further object is to provide a system fully compatible with post-film-recording restoration techniques, which then combined with the instant invention extend thereto an additional benefit.

It is a yet further object to provide a system which eliminates drift in the image by providing a lockpoint in the image plane.

Accordingly, the instant invention employs separate aperture phase shifters to introduce equal and opposite (time-varying) phase shifts across each aperture in such a way as to compensate for the atmospheric shifts. For example, in astronomical imaging the image is to be made as bright and sharp as possible. To achieve this purpose, we need a measure of the image contrast or sharpness and also we require a technique for maximizing it with respect to the control variables, such as the phase delay applied to the waves as received at each subaperture. The measure of contrast is best understood by the one-dimensional image point intensity distributions as stated in equation (1) below. Although the point spread functions of individual samples of atmospheric disturbed images are distinctly nongaussion, the time average of such functions tends to be gaussian so we illustrate them as gaussian. Of more importance, the integrals of the intensity distribution tends to be a constant independent of the magnitude of the atmospheric disturbance since the phase errors only redistribute the total energy from the source. Thus, if we integrate the total source image intensity under high and low turbulence conditions, we obtain essentially the same result. For example, if the image intensity distribution, I, is gaussian, then $$I = a e^{-|a(x-x_0)|^2} \tag{1}$$

the integrated intensity distribution, does not change between sharp images (high values of $a$) and diffuse images (low values of $a$). On the other hand, if we use a "nonlinear" detector wherein the local current or voltage increases at a higher rate than linear with local optical intensity, a quite different result is obtained. In particular, the squared integrated optical intensity, for example, increases linearly with $a$, that is, in proportion to pattern sharpness or narrowness. Note that this measure of pattern sharpness does not require one to determine where in the image plane the brightest portion of the image is located, since it functions equally well for any value of $x_0$, reasonably removed from an edge. In fact, it is true as well for a number of isolated image spots in arbitrary locations. For two images which have substantial overlap (under high distortion or noncorrected conditions), the matter is not so obvious, although the essential conclusions remain true. Therefore, in this particular approach, it is proposed to examine the integral of the square (or other nonlinear functional form) of the image intensity distribution as a function of the various aperture phase controls.

This integration may be accomplished, for example, by simply placing a large area nonlinear photocell in the image plane. The detected outputs then provide error signals for driving the phase shifters in such a way that the detector output is maximized. More particularly, these phase controls may be dithered at distinctive sinusoidal rates, with separate synchronous detection of each of the induced amplitude components in the nonlinear detector output. However, although the image is well formed with use of the instant system, it may still exhibit considerable jitter (sidewise motion) from time-varying tilts in the arriving wavefront. Consequently, an option is provided in this system having a viewer or operator designated lock point in the image plane whereby the viewer can designate an appropriate image feature, preferably a bright peak in the image distribution, or more accurately, a selection aperture in the image plane roughly centered on the bright peak. This aperture can be backed by a quadrant detector which provides a source of error signals for a tilting or steering mirror. Automatic detection of high contrast features can also be effected to give automatically designated lockpoints in the image plane.

BRIEF DESCRIPTION OF THE DRAWINGS

FIG. 5b shows a functional equivalent of a nonlinear image quality sensor usable instead of the sensor of FIG. 5a.

DETAILED DESCRIPTION

General Theoretical Basis

Figure 1:
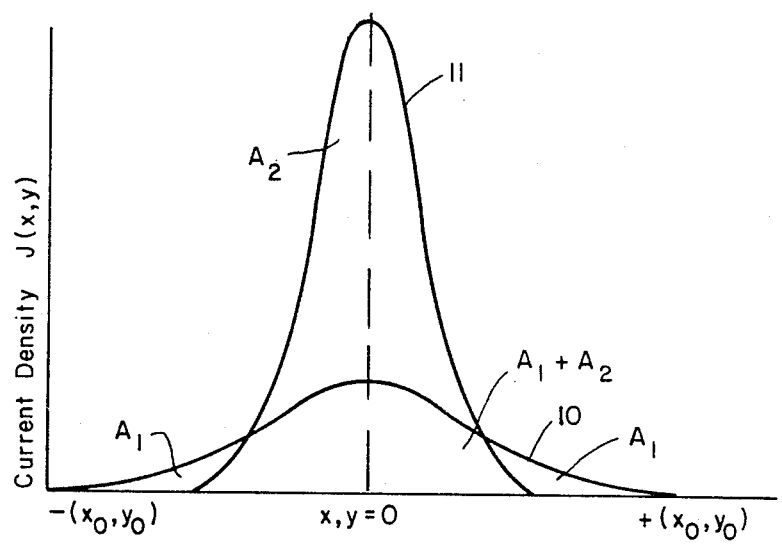
FIG. 1 is a response curve of the nonlinear sensor current density in the image plane showing the effect of improved image quality output in accordance with this invention.

Referring to FIG. 1, though for convenience, it was simpler to state the gaussian image intensity distribution in equation (1) as a function of a single spatial variable $x$; actually the total current is a function of the integral of $J(x, y)$ varying in two dimensions, X and Y, which may be stated in terms of the areas under curves 10 or 11 as:

$$\text{Total Current} = K \int_{-(x_o,y_o)}^{+(x_o,y_o)} [J(x, y)]^2 dx\, dy \qquad (2)$$

where the width of the distorted image represented by curve 10 is less than $2\,|x_o|$ in the X direction and less than $2\,|y_o|$ in the Y direction, and $I(x, y)$ is the image optical intensity as a function of $x$ and $y$, and K is a scaling constant.

Since the area $A_1$ under the uncompensated or distorted curve 10 is much smaller than the area $A_2$ under compensated curve 11, the corresponding net detector current is much less under curve 10 than under curve 11.

Figure 2:
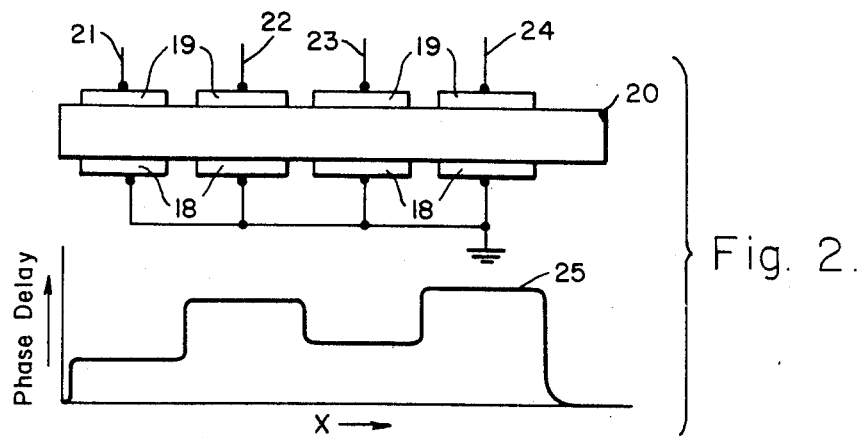
FIG. 2 is an elevation view of a phase shifter and corresponding response curve of phase delay as a function of discrete step phase variation, used in a phaser matrix of the inventive system.
Figure 3:
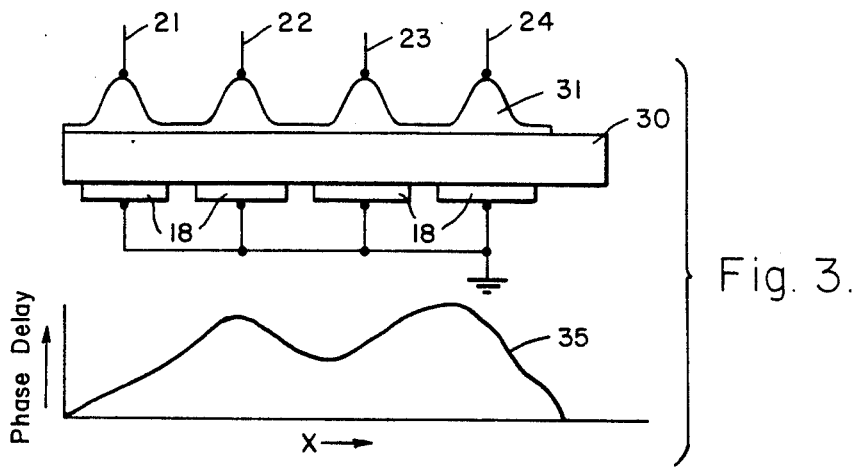
FIG. 3 is an elevation view of a phase shifter with a modified electrode structure together with its corresponding response curve of phase delay used in lieu of phase shifter of FIG. 2 and providing smooth phase variation with respect to distance.

Referring to FIGS. 2 and 3, it may be stated that although it has been convenient for discussion purposes to assume rectangular step phase errors and rectangular step phase correcting devices, in fact, it is to be expected that the phase errors are smoothly varying functions of position and that it is more efficient in terms of correction quality to introduce corresponding phase error-correcting devices which present a more smoothly varying correction with space than rectangular steps. Thus, for example, with an electro-optical (field dependent) phase shifter, one might employ electrode patches of relatively high conductivity coupled by areas of low conductivity such that the fields and hence the phase shifts vary smoothly from point to point.

Accordingly, FIG. 2 shows the structure comprising a crystal of the KDP type made of $KH_2PO_4$ at 20 with electrically conductive transparent electrodes 18 and 19 at the major surfaces of the crystal. Such electrodes are optically transparent, and the index of refraction of the crystal may be varied in known manner by applying different voltages of either AC or DC type to wires 21, 22, 23 and 24 and ground return, to result in phase delay as a function of discrete step variation as shown in curve 25.

FIG. 3, on the other hand, shows the same KDP type crystal at 30 with only a plurality of electrically conductive transparent electrodes 18 at one surface thereof and a special electrically conductive transparent electrode 31 of non-uniform surface height attached to crystal 30. The peaks of electrode 31 are attached to wires 21, 22, 23 and 24 to enable application of different voltages of either AC or DC between these wires and ground return so as to vary the applied field and hence the phase delay smoothly rather than discretely as in FIG. 2 and thereby obtain response curve as at 35.

Proof That The Image Integral Squared Intensity Maximizes For A Corrected Aperture The image may be given by the convolution of the aperture point-spread-function (PSF) with the source distribution intensity. Such convolution formula was developed in Chapter 5 of "Introduction to Statistical Optics", by O'Neill, Addison-Wesley, Reading, Mass., 1963, which states:

$$I(\underline{X}) = S(\underline{X}) \circledast \overline{PSF}(\underline{X}) \qquad (3)$$

where $\underline{X}$ is the displacement in the image plane and $\circledast$ denotes convolution. The aperture point-spread-function (PSF) for a perfect circular aperture (and distortion free path) is given by the well known Airy disk as in "Introduction to Statistical Optics", or for a perfect annular aperture as developed in "Applied Optics", January 1974 issue by Tschunko, is:

$$I = (1-a^2)^{-2} \left[ \frac{2J_1(r)}{r} - \frac{a^2 2J_1(ar)}{(ar)} \right]^2. \qquad (4)$$

where $a$ is the central obscuration ratio.

For a more general aperture with path length index distortion $\Delta l(\underline{x})$ the aperture field from a point source is:

$$ea(\underline{x}) = \exp[i\epsilon(\underline{x})] = \exp\left[i\frac{2\pi}{\lambda}\Delta l(\underline{x})\right] \qquad (5)$$

and the PSF is given by the publication of "Introduction to Statistical Optics", which states:

$$\overline{PSF}(x) = F^{-1}[\epsilon a(\underline{x}) \circledast \epsilon a(\underline{x})] \qquad (6)$$

where $F^{-1}$ is the inverse Fourier transform operator. The intensity of (3) may be represented by a field $E(\underline{X})$ where $$I(\underline{X}) = |E(\underline{X})|^2 \qquad (7)$$

while the aperture plane field distribution (at any optical frequency) is given by the Fourier transform of the image fields $E(\underline{X})$.

By Parseval's theorem $$\int I^2(\underline{X}) d\underline{X} = \int |E(\underline{X})|^4 d\underline{X} = \int \{F[I(\underline{X})]\}^2 d\underline{X} \qquad (8)$$

where $F$ denotes the Fourier transform operator. By the convolution theorem and (6)

$$F[I(\underline{X})] = [F(S)] [Ea(x) \circledast Ea(x)] \qquad (9)$$

such that (8) becomes $$\int I^2(\underline{X}) d\underline{X} = \int [s(\underline{x})]^2 |\epsilon a(\underline{x}) \circledast \epsilon a(\underline{x})|^2 d(\underline{x}) \qquad (10)$$

where $s(x)$ is the transform of the source distribution. Substituting from (5) and expressing the convolution of (10) as an integral gives $$\int I^2(\underline{X}) d\underline{X} = \int d\underline{x} [s(\underline{x})]^2 \left| \int \exp i[\beta(\underline{y}) - \beta(\underline{y} - \underline{x})]_{d\underline{v}} \right|^2 \qquad (11)$$

The first factor in (11) is solely determined by the image distribution and is not subject to variation. The second factor maximizes for every $\underline{x}$, when $$\beta(\underline{y}) = \beta(\underline{y} - \underline{x}) \qquad (12)$$

in other terms when all $\Delta l (\underline{x})$ are equal, for every $\underline{x}$.

All terms in equations (3)–(12) are defined in the quoted references for "Introduction to Statistical Optics."

An exception occurs when $s(\underline{x})$ vanished at one or more values of $\underline{x}$. For these cases it does not matter if (12) is satisfied, since no contribution to the integral occurs from these terms. In other words, particular spatial frequencies in the aperture modulation transfer function (MTF) result is obtained from certain sets of elements spaced at the associated distance. If the associated spatial frequency from the source is not present and does not drive the MTF, then it does not matter if these elements are in phase or not.

Mechanization

Figure 4:
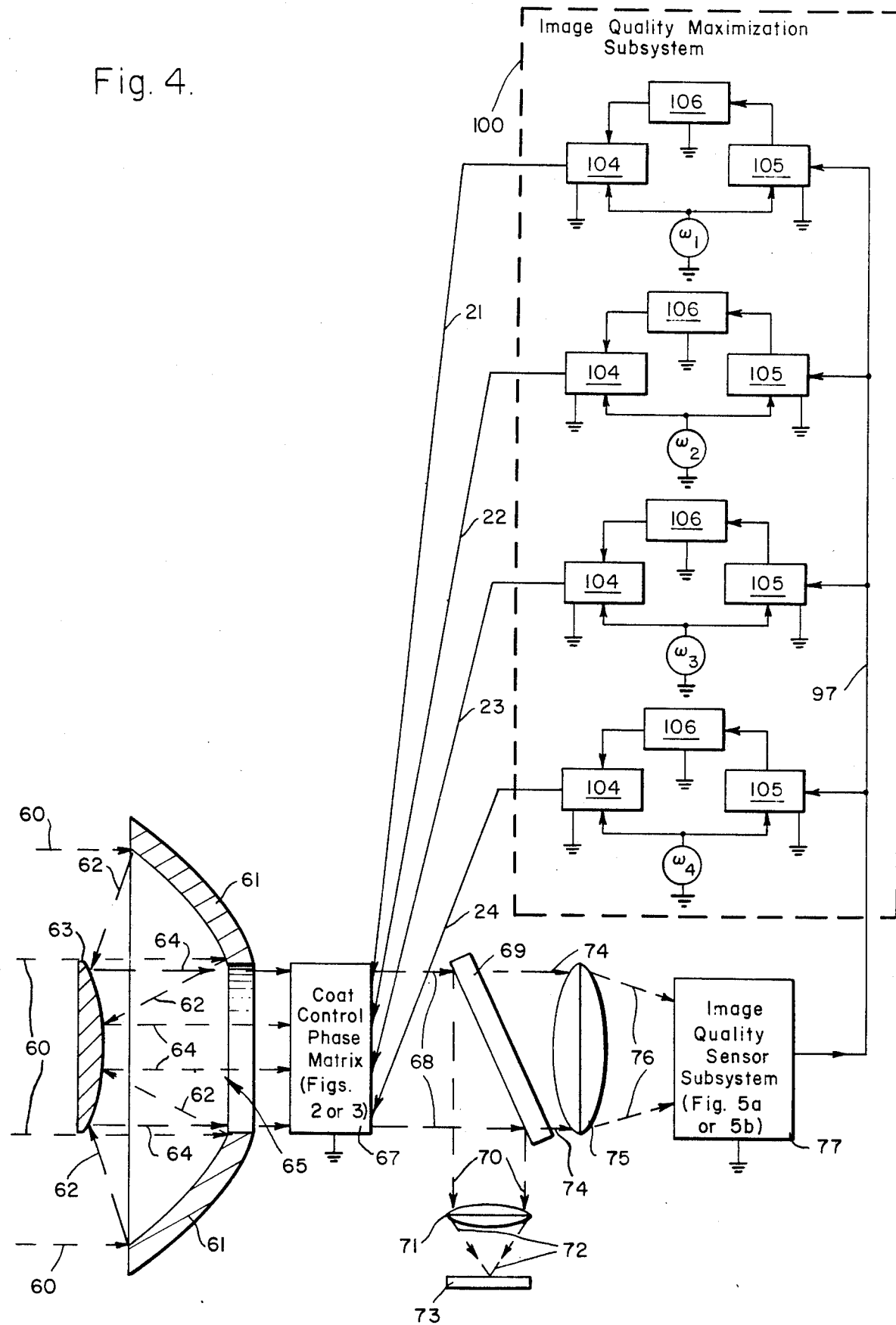
FIG. 4 is an optical-electrical schematic of the adaptive image telescope representing nonlinear sensing.

Referring to FIG. 4, a system schematic utilizing the inventive techniques provides an overview of the apparatus needed to achieve the desired results.

In this invention one chooses some quantitative measure of image quality or sharpness and maximizes it over the range of phaser matrix path length variations. As an aid to the maximization process, it is generally helpful for the control system to have the ability to introduce trial path length perturbations, as explicitly illustrated in FIG. 4.

The manner in which the element perturbation or image quality maximization subsystem 100 functions need not be discussed with particularity since such system is discussed in detail in U.S. Pat. No. 3,731,103. Briefly, system 100 comprises four different electronic circuits, each circuit being fed by a different frequency $\omega_1$, $\omega_2$, $\omega_3$ and $\omega_4$ respectively. Each said circuit is responsive to the appropriate frequency wherein said appropriate frequency feeds on operational amplifier 104 and a synchronous detector 105. Output of detector 105 feeds a low pass filter 106. Generally the low pass band is chosen to give a closed loop response ranging between 100 and 1000 Hz. The output of filter 106 also feeds operational amplifier summer 104. In each of the electronic circuits, outputs 21, 22, 23 and 24 from the four operational amplifiers are provided as inputs to the elements of matrix 67.

Figure 5A:
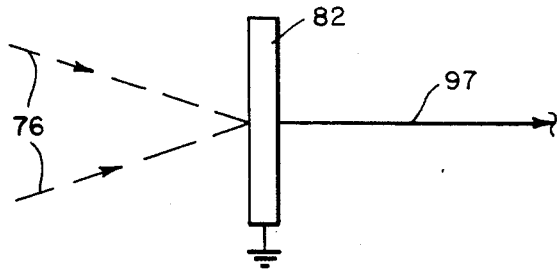
FIG. 5a shows a nonlinear image quality sensor unit (nonlinear detector) that may be used in the image quality sensor subsystem in accordance with this invention.

Hence, referring to FIGS. 4 and 5a, an optical beam as at 60 is reflected from telescope reflector 61 and impinged as beam 62 on reflector 63, to be directed by reflector 63 as beam 64 exiting through aperture 65 in reflector 61 and to impinge upon the elements of coherent optical adaptive technique (COAT) control phaser matrix 67.

The elements of matrix 67 may be those shown in FIG. 2 or FIG. 3 as hereinabove described.

Optical beam as at 68 is propagated through the matrix elements of FIGS. 2 or 3 to impinge upon and be reflected from beam splitter 69 to be split as beam 70 impinging on lens 71, and exiting lens 71 as beam 72 to impinge as a normal image upon a photographic plate or the like as at 73.

The other portion of beam 68 is directed through beam splitter 69 as beam 74 through lens 75 to impinge as beam 76 on image quality sensor assembly 77.

Figure 5B:
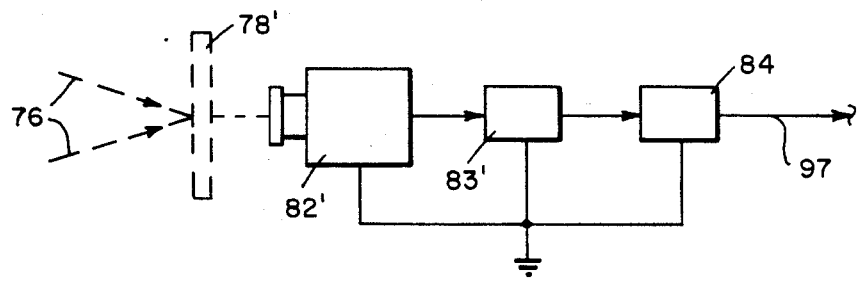

Sensor assembly 77 is comprised of the configuration shown in FIGS. 5a or 5b.

In FIG. 5a sensor 77 is a nonlinear photodetector plate 82 provided as a way of implementing the image quality sensor. Plate 82 is generally made of a semiconductor photosensitve material, or of cadmium sulfide. Hence, beam 76 will pass through plate 82 as an error signal as given by equation (2), such signal being provided at 97.

Accordingly, error signals may be provided from the detector unit as at 97 as output of the image quality sensor 77 to provide inputs to analog system 100. System 100 will compute the error signals by synchronously detecting (or demodulating) with low frequency signals fed to perturbation circuits comprising elements 104, 105 and 106 within system 100. These error signals are thus contained in the amplitude modulation signals of beam 76 with the several low frequencies $\omega_1$, $\omega_2$, $\omega_3$, $\omega_4$ ... $\omega_n$ as used in the several circuits comprising perturbation system 100. Output of these circuits are provided at 21, 22, 23, and 24 to connect to the complementary numbered wires of FIG. 2 or to the complementary numbered wires of FIG. 3 so that the signals at 21–24 will impinge on either crystals 20 or 30 to phase modulate the optical signal (passing from telescope output through telescope aperture 65) in order to provide the corrective action and improved image quality, either in discrete steps or smoothly.

Figure 4A:
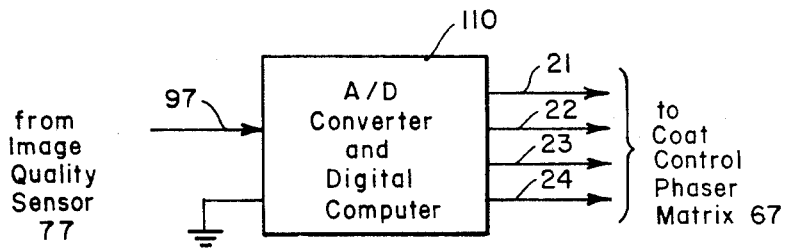
FIG. 4a shows alternate digital computer usage in the instant system in lieu of analog circuitry used therein.

Referring to FIG. 4a, an alternative system utilizing a digital computer as at 110 may be substituted in FIG. 4 for subsystem 100. Inputs to computer 110 constitute the same outputs from image quality sensor 77, and the outputs from computer 110 constitute inputs 21–24 to control phaser matrix 67.

It may be noted that although the image may be well-formed via the present invention it is not free of drift or jitter from time varying tilts in the arriving wavefront. One may counteract this problem by either exposing the film for a sufficiently short time, typically less than 1/100 second, so that the image is frozen or by imparting auxiliary apparatus such as a conventional linear quadrant detector, and steering mirrors to hold the image centroid centered on the linear quadrant detector. Such linear quadrant circuit is shown in the following publications: R. B. Leighton, "Concerning the Problem of Making Sharper Photographs of the Planets," Sci. Amer. 194, 1957 (June 1956). J. H. DeWitt, R. H. Hardie, and C. K. Seyfret, "A Seeing Compensator Employing Television Techniques," Sky and Telescope 17, 8 (November 1957).

In the foregoing discussion, a method was provided for sensing the peakedness in an optical image distribution via a nonlinear photodetector. Thus, defocused or dephased image distributions were illustrated which typically have substantially the same optical flux as an ideally focused or phased image, but with a less peaked distribution. The essence of the invention is to detect this redistribution in optical flux. Although the majority of optical photodetectors are not sensitive to the distribution, responding only to the integrated flux impinging on them, it is pointed out that a photodetector which is intrinsically or homogeneously nonlinear is sensitive to the distribution. Although photodetectors are known which exhibit the desired nonlinearity at high flux levels, not all imaging system can achieve the desired flux levels.

Consequently referring to FIG. 5b one may utilize the functional equivalent of the nonlinear image quality sensor 82. In this implementation the image plane is shown at 78' due to the beam received at 76, provides an optical sensor as input to a sensing video camera 82'. The electrical output of camera 82' is applied to a conventional electronic nonlinear squaring circuit 83', and the output of circuit 83' is applied to an electronic integrating circuit 84' to achieve the same effective output at 97 as provided by nonlinear detector 82' and as given by equation (2). Means 82', 83' and 84' are each individually well known in the art and details thereof need not be provided herein.

In the foregoing figures hard wire electrical signal return path is illustrated by the conventional ground symbol.

What is claimed is:

1. In an adaptive imaging telescope for detecting an optical beam received thereby, comprising in combination:
    a phase shifter, including a planar crystal having two major surfaces and a plurality of electrodes attached to the major surfaces, which phase shifter is positioned in a plane parallel to the plane of the aperture of the telescope, responsive to an optical image, communicated by said beam;
    first means, optically coupled to the phase shifter, comprising a photodetector, positioned substantially orthogonally to said optical beam, responsive to the optical image for converting said image into an electrical signal, which is non-linear in magnitude with respect to the signal of said optical beam; and
    second means, electrically coupling the first means and the phase shifter, for providing phase modulation of the optical beam.

2. The invention as stated in claim 1, wherein said planar crystal is of the electro-optic type, said plurality of electrodes comprises a first plurality of electrodes attached to one of the major surfaces, and a second plurality of electrodes attached to the other of the major surfaces opposite to said one of the major surfaces, for providing phase delay of the received optical image in discrete steps, the photodetector comprising a photoresponsive plate.

3. The invention as stated in claim 2, wherein said electrodes are of electrically conductive optically transparent material.

4. The invention as stated in claim 2, wherein the second means is electrically connected to the electrodes of the phase shifter.

5. The invention as stated in claim 4, including:
    an optical beam splitter; and
    an optical beam focusing lens, said beam splitter being positioned in line with the optical image and angularly positioned with respect to the phase shifter and the focusing lens, said beam splitter and focusing lens being both positioned intermediate the phase shifter and first means.

6. The invention as stated in claim 5, including:
    another lens responsive to light reflected from the beam splitter; and
    means for photographing a received image by virtue of the light communicated through said another lens.

7. The invention as stated in claim 1, wherein the planar crystal is of the electro-optic type, and wherein the plurality of electrodes comprises a multiple number of electrodes attached to one of the major surfaces and an electrode of non-uniform surface height attached to the other of the major surfaces opposite to said one major surface, for providing smoothly varying phase delay of the received optical image, the photodetector comprising a photoresponsive plate.

8. The invention as stated in claim 7, wherein said electrodes are of electrically conductive optically transparent material.

9. The invention as stated in claim 7, wherein the second means is electrically connected to the electrodes of the phase shifter.

10. The invention as stated in claim 9, including:
    an optical beam splitter; and
    an optical beam focusing lens, said beam splitter being positioned in line with the optical image and angularly positioned with respect to the phase shifter and the focusing lens, said beam splitter and focusing lens being both positioned intermediate the phase shifter and first means.

11. The invention as stated in claim 10, including:
    another lens responsive to light reflected from the beam splitter; and
    means for photographing a received image by virtue of the light communicated through said another lens.

12. The invention as stated in claim 1, wherein said planar crystal is of the electro-optic type, said plurality of electrodes comprises a first plurality of electrodes attached to one of the major surfaces, and a second plurality of electrodes attached to the other of the major surfaces opposite to said one of the major surfaces, for providing phase delay of the received optical image in discrete steps, the photodetector comprising a video camera positioned at the plane of the optical image and responsive to said image, an electronic squaring circuit electrically connected to the output of the camera, and an integrating circuit responsive to outputs from the squaring circuit.

13. The invention as stated in claim 12, wherein said electrodes are of electrically conductive optically transparent material.

14. The invention as stated in claim 12, wherein the second means is electrically connected to the electrodes of the phase shifter.

15. The invention as stated in claim 14, including:
an optical beam splitter; and
an optical beam focusing lens, said beam splitter being positioned in line with the optical image and angularly positioned with respect to the phase shifter and the focusing lens, said beam splitter and focusing lens being both positioned intermediate the phase shifter and first means.

16. The invention as stated in claim 15, including:
another lens responsive to light reflected from the beam splitter; and
means for photographing a received image by virtue of the light communicated through said another lens.

17. The invention as stated in claim 1, wherein the planar crystal is of the electro-optic type, and wherein the plurality of electrodes comprises a multiple number of electrodes attached to one of the major surfaces and an electrode of non-uniform surface height attached to the other of the major surfaces for providing smoothly varying phase delay of the received optical image, the photodetector comprising a video camera positioned at the plane of the optical image and responsive to said image, an electronic squaring circuit electrically connected to the output of the camera, and an integrating circuit responsive to outputs from the squaring circuit.

18. The invention as stated in claim 17, wherein said electrodes are of electrically conductive optically transparent material.

19. The invention as stated in claim 17, wherein the second means is electrically connected to the electrodes of the phase shifter.

20. The invention as stated in claim 19, including:
an optical beam splitter; and
an optical beam focusing lens, said beam splitter being positioned in line with the optical image and angularly positioned with respect to the phase shifter and the focusing lens, said beam splitter and focusing lens being both positioned intermediate the phase shifter and first means.

21. The invention as stated in claim 20, including:
another lens responsive to light reflected from the beam splitter; and
means for photographing a received image by virtue of the light communicated through said another lens.

* * * * *

UNITED STATES PATENT OFFICE
CERTIFICATE OF CORRECTION

PATENT NO. : 3,988,608
DATED : October 26, 1976
INVENTOR(S) : THOMAS R. O'MEARA

It is certified that error appears in the above-identified patent and that said Letters Patent are hereby corrected as shown below:

| COLUMN | LINE | DELETE | SUBSTITUTE |
|---|---|---|---|
| 1 | 31 | characteristics | characteristic |
| 2 | 47 | equation (1) | $I = a\, e^{-[a(x-x_0)]^2}$ (1) |
| 5 | 10 | equation (5) | $\mathcal{E}a(\underline{x}) = \exp[i\mathcal{E}(\underline{x})] = \exp\left[i\frac{2\pi}{\lambda}\Delta\ell(\underline{x})\right]$ (5) |
| 5 | 15 | equation (6) | $\overline{PSF}(x) = F^{-1}[\mathcal{E}a(\underline{x}) \circledast \mathcal{E}a^*(\underline{x})]$ (6) |
| 5 | 32 | equation (9) | $F[I(\underline{X})] = [F(S)][Ea(x) \circledast Ea^*(x)]$ (9) |
| 5 | 36 | equation (10) | $\int I^2(\underline{X})\, d\underline{X} = \int [s(\underline{x})]^2\, \left\|\mathcal{E}a(\underline{x}) \circledast \mathcal{E}a^*(\underline{x})\right\|^2 d(\underline{x})$ (10) |
| 5 | 42 | equation (11) | $\int I^2(\underline{X})\, d\underline{X} = \int d\underline{x}\,[s(\underline{x})]^2 \left\|\int \exp i[\beta(\underline{y}) - \beta(\underline{y}-\underline{x})]\, d\underline{y}\right\|^2$ (11) |

UNITED STATES PATENT OFFICE
CERTIFICATE OF CORRECTION

PATENT NO. : 3,988,608
DATED : October 26, 1976
INVENTOR(S) : THOMAS R. O'MEARA

It is certified that error appears in the above-identified patent and that said Letters Patent are hereby corrected as shown below:

Claim 1, Column 7, Lines 58 through 60 should read:

1. An adaptive imaging telescope for detecting an optical beam received thereby comprising in combination:

Signed and Sealed this

Fourth Day of January 1977

[SEAL]

Attest:

RUTH C. MASON
Attesting Officer

C. MARSHALL DANN
Commissioner of Patents and Trademarks